(12) United States Patent
Son

(10) Patent No.: US 9,899,809 B2
(45) Date of Patent: Feb. 20, 2018

(54) MOTOR CONTROL CENTER UNIT

(71) Applicant: LSIS CO., LTD., Anyang-si, Gyeonggi-do (KR)

(72) Inventor: Minsoo Son, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/376,532

(22) Filed: Dec. 12, 2016

(65) Prior Publication Data

US 2017/0271854 A1    Sep. 21, 2017

(30) Foreign Application Priority Data

Mar. 16, 2016 (KR) .................. 20-2016-0001434 U

(51) Int. Cl.
| | |
|---|---|
| H02B 1/38 | (2006.01) |
| H02B 1/36 | (2006.01) |
| H02B 1/21 | (2006.01) |
| H02B 1/30 | (2006.01) |
| H02H 3/04 | (2006.01) |
| H02H 3/08 | (2006.01) |

(52) U.S. Cl.
CPC .................. *H02B 1/36* (2013.01); *H02B 1/21* (2013.01); *H02B 1/306* (2013.01); *H02B 1/38* (2013.01); *H02H 3/04* (2013.01); *H02H 3/08* (2013.01)

(58) Field of Classification Search
None
See application file for complete search history.

(56) References Cited

U.S. PATENT DOCUMENTS

| | | | | |
|---|---|---|---|---|
| 3,983,460 A * | 9/1976 | Kuhn | ...................... | H02B 11/26 200/50.21 |
| 4,305,114 A * | 12/1981 | Takagi | ..................... | H02B 3/00 361/609 |
| 5,539,614 A * | 7/1996 | Ishikawa | .................. | H02B 1/21 361/603 |
| 5,625,531 A | 4/1997 | Padilla et al. | | |
| 6,467,640 B1 * | 10/2002 | Hung | ................... | E05D 7/1011 174/50 |

(Continued)

FOREIGN PATENT DOCUMENTS

| | | |
|---|---|---|
| JP | S6336105 | 3/1988 |
| JP | 2009067362 | 4/2009 |

(Continued)

OTHER PUBLICATIONS

European Patent Office Application Serial No. 16199771.3, Search Report dated Jun. 14, 2017, 9 pages.

(Continued)

*Primary Examiner* — Xanthia C Cunningham
(74) *Attorney, Agent, or Firm* — K&L Gates LLP

(57) ABSTRACT

A motor control center (MCC) unit includes a drawer having a space for accommodating a circuit breaker, a hinge bracket installed on one of left and right sides of the drawer, a base connected to the hinge bracket by a hinge shaft, and a display mechanism installation plate fastened to the base by a fastening member. Although a display mechanism or a display mechanism installation plates are different according to sizes or models of the MCC unit, a base and a hinge bracket may be commonly used.

11 Claims, 9 Drawing Sheets

(56) References Cited

U.S. PATENT DOCUMENTS

| | | | | |
|---|---|---|---|---|
| 6,878,891 B1* | 4/2005 | Josten | ............... | H02B 13/025 |
| | | | | 200/293 |
| 7,558,052 B1* | 7/2009 | Coomer | ............... | H02B 11/02 |
| | | | | 200/306 |
| 7,952,042 B2* | 5/2011 | Coomer | ............... | H02B 11/02 |
| | | | | 200/293 |
| 9,451,718 B2* | 9/2016 | Oneufer | ............... | H02B 1/36 |
| 2007/0111575 A1* | 5/2007 | Jensen | ............... | H01R 13/6315 |
| | | | | 439/246 |
| 2011/0279225 A1* | 11/2011 | Frontino | ............... | G07D 11/0066 |
| | | | | 340/5.3 |
| 2013/0194772 A1* | 8/2013 | Rojo | ............... | H04Q 1/112 |
| | | | | 361/818 |
| 2016/0241007 A1* | 8/2016 | Tremaine | ............... | H02G 3/123 |

FOREIGN PATENT DOCUMENTS

| | | |
|---|---|---|
| JP | 2009143298 | 7/2009 |
| JP | 2010061143 | 3/2010 |
| JP | 2011151912 A | 8/2011 |
| JP | 2014181467 | 9/2014 |
| KR | 20120020658 A | 3/2012 |
| WO | 2009101713 | 8/2009 |
| WO | 2014095905 | 6/2014 |

OTHER PUBLICATIONS

Korean Office Action for related Korean Application No. 20-2016-0001434; action dated Dec. 15, 2017; (5 pages).

* cited by examiner

MOTOR CONTROL CENTER UNIT

CROSS-REFERENCE TO RELATED APPLICATION

Pursuant to 35 U.S.C. § 119(a), this application claims the benefit of earlier filing date and right of priority to Korean Application No. 20-2016-0001434, filed on Mar. 16, 2016, the contents of which are all hereby incorporated by reference herein in its entirety.

BACKGROUND OF THE INVENTION

1. Field of the Invention

The present disclosure relates to a motor control center unit, and particularly, to a motor control center unit having a display mechanism.

2. Background of the Invention

A motor control center (MCC) is a system for safely protecting a load device related to a motor installed in various industrial facilities.

The motor control center has a function of distributing low voltage electricity supplied from a transformer to a motor, and monitoring and preventing flowing of an over-current.

The motor control center may receive a plurality of motor control center (MCC) units in a cabinet (e.g., an iron enclosure), and the MCC units may be detachably installed in the cabinet.

The motor control center may have a bus (bus bar) for supplying electricity to the interior, and the MCC unit may be moved as a drawer so as to be connected to the bus.

The MCC unit may be an electric control device for controlling a motor. The MCC unit may control rotation of the motor by selectively supplying power required for the motor, changing a direction in which power is supplied, and the like.

The MCC unit may include a display mechanism providing alarm to the outside, and the display mechanism may be installed in a display mechanism installation plate of the MCC unit.

SUMMARY OF THE INVENTION

Therefore, an aspect of the detailed description is to provide a motor control center (MCC) unit capable of commonly using a component although a display mechanism or a display mechanism installation plate is different in size.

To achieve these and other advantages and in accordance with the purpose of this specification, as embodied and broadly described herein, a motor control center (MCC) unit includes: a drawer having a space for accommodating a circuit breaker; a hinge bracket installed on one of left and right sides of the drawer; a base connected to the hinge bracket by a hinge shaft; and a display mechanism installation plate fastened to the base by a fastening member.

The MCC unit may further include: an anchor installed to be spaced apart from the hinge bracket on a lower plate of the drawer, wherein a base protrusion may be formed in the base and a base protrusion aligning portion may be provided in the anchor and allowing the base protrusion to be inserted therein to determine a position of the base protrusion.

The MCC unit may further include: a front door installed to rotate centered on the opposite side of the hinge bracket, wherein an opening may be provided in a position of the front door corresponding to the display mechanism installation plate.

The MCC unit may further include: a packing installed along the opening.

The hinge bracket may include: a rear body; a rear protruding body protruding backwardly from one side of the rear body and fastened to the drawer; a side body bent forwardly from the other side of the rear body; a front body bent from the side body to be parallel to the rear body and longer than the rear body; a front protruding body protruding from the front body in an opposite direction of the rear protruding body; and a hinge shaft support body formed at a front end of the front protruding body and surrounding an outer circumference of the hinge shaft.

The fastening member may include a nut inserted into a nut insertion recess portion formed in the base; and a bolt fastened to the nut through a bolt through hole formed in the display mechanism installation plate.

The MCC unit may further include: a door locker rotatably disposed in the front door; and a locking body fastened to the door locker and locked to the hinge bracket or unlocked therefrom.

The door locker may include: a head portion spaced apart from the locking body; and a neck portion positioned between the head portion and the locking body 120 and having a size smaller than that of the head portion. The locking body may be fastened to the neck portion.

The hinge bracket may have a neck portion through hole through which the locking body passes and in which the neck portion is positioned in a penetrating manner. The locking body may have a size smaller than that of the neck portion through hole, and after the locking body passes through the neck portion through hole, the locking body may rotate to be locked in the vicinity of the neck portion through hole in a forward direction.

The locking body may include a front protrusion protruding in a forward direction, and the hinge bracket may have a front protrusion aligning portion formed in the vicinity of the neck portion through hole, into which the front protrusion is inserted.

The front protrusion may be provided in plurality in the locking body, and one of the plurality of front protrusions may be inserted into the front protrusion aligning portion.

According to the embodiment of the present disclosure, although a display mechanism or a display mechanism installation plates are different according to sizes or models of the MCC unit, a base and a hinge bracket may be commonly used.

Also, the base may be supported by the hinge bracket and the anchor and firmly maintained without being inclined.

Also, the hinge bracket may also serve to lock the front door and the number of components may be minimized.

Also, since the hinge bracket prevents the front door from being inclined, malfunction of the front door may be minimized.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 11 is locked to a hinge bracket.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a specific embodiment of the present disclosure will be described in detail with reference to the accompanying drawings.

Figure 1:
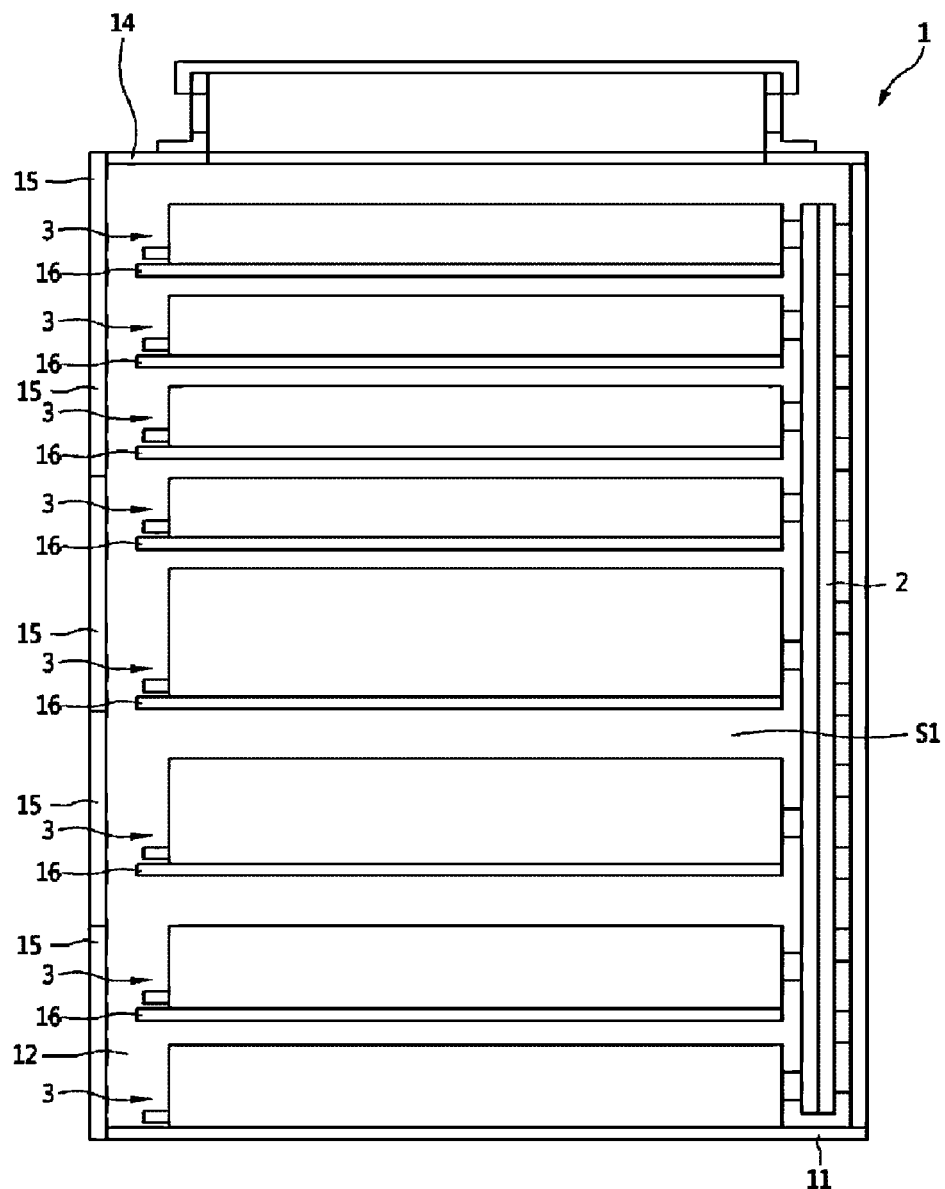
FIG. 1 is a side view illustrating an interior of a motor control center (MCC) in which an MCC unit according to an embodiment of the present disclosure is installed.

FIG. 1 is a side view illustrating an interior of a motor control center (MCC) in which an MCC unit according to an embodiment of the present disclosure is installed.

The MCC illustrated in FIG. 1 includes a cabinet 1, a bus 2, and an MCC unit 3.

The cabinet 1 may form an appearance of the MCC. The cabinet 1 may have a space S for accommodating the bus 2 and the MCC unit 3. The cabinet 1 may be open at one side thereof. The MCC unit 3 may enter through the open side of the cabinet 1.

The cabinet 1 may include a base 11, a pair of side body 12 and rear body 13 disposed on the base 11, and a top cover 14 disposed on the pair of side body 12 and rear body 13.

A door 15 for opening and closing the space S may be rotatably connected to the cabinet 1. The door 15 may be installed in plurality to divide and open the space S.

The MCC includes a partition 16 disposed within the cabinet 1 and partitioning the inside of the cabinet 1.

The partition 16 may be horizontally disposed within the cabinet 1. The partition 1 may be coupled to the side body 12 of the cabinet 1.

The partition 16 may be provided in plurality within the cabinet 1, and the plurality of partitions 16 may be disposed to be spaced apart from each other vertically in the space S. The partition 16 may be installed such that a rear end thereof is spaced apart from the rear body 13, and a gap may be provided between the rear end of the partition 16 and the rear body 13. The partition 16 may be installed such that the rear end thereof is not in contact with the bus 2.

The bus 2 may be disposed to extend in a vertical direction within the cabinet 1. The bus 2 may be disposed to be closer to the rear body 13, among the door 15 and the rear body 13. The bus 2 may be disposed on a rear side, among a front side and the rear side, within the cabinet 1.

The bus 2 may be connected to the MCC unit 3. The bus 2 may be fixedly positioned in the cabinet 1, and the MCC unit 3 may be moved from a front side of the bus 2 toward the bus 2 so as to be connected to the bus 2. The bus 2 may be a vertical bus disposed to extend in a vertical direction in the space S. The bus 2 may be provided in plurality in the space @. The plurality of buses 2 may be disposed to be spaced apart from each other in a horizontal direction within the cabinet 1. The plurality of buses 2 may be connected to the MCC units 3, respectively.

The MCC 3 unit may be a motor control unit controlling rotation of a motor by selectively supplying power required for the motor or changing a supply direction of power.

The MCC unit 3 may be mounted on the partition 16. In the MCC, a plurality of MCC units 3 may be installed in the cabinet 1.

Figure 2:
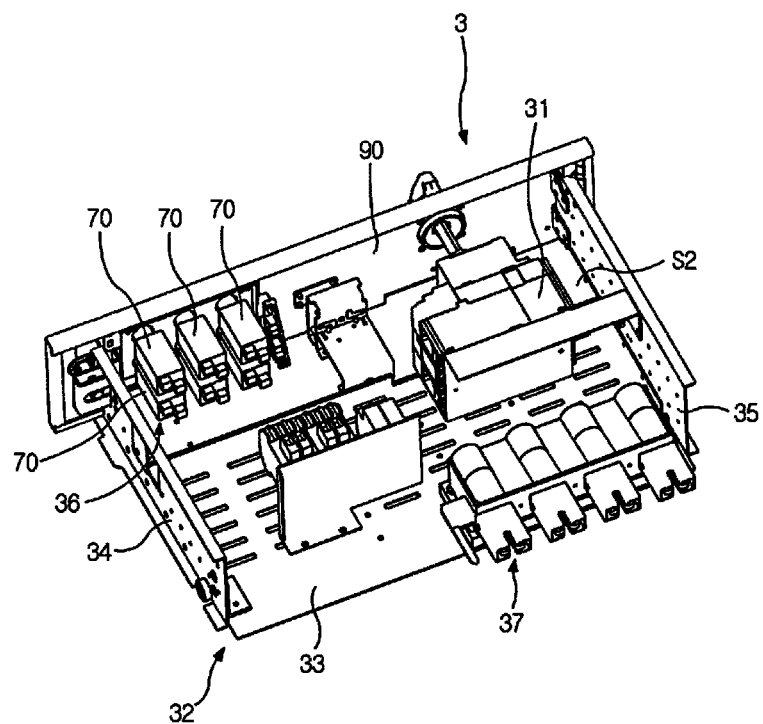
FIG. 2 is a perspective view of a rear side of an MCC unit according to an embodiment of the present disclosure.
Figure 3:
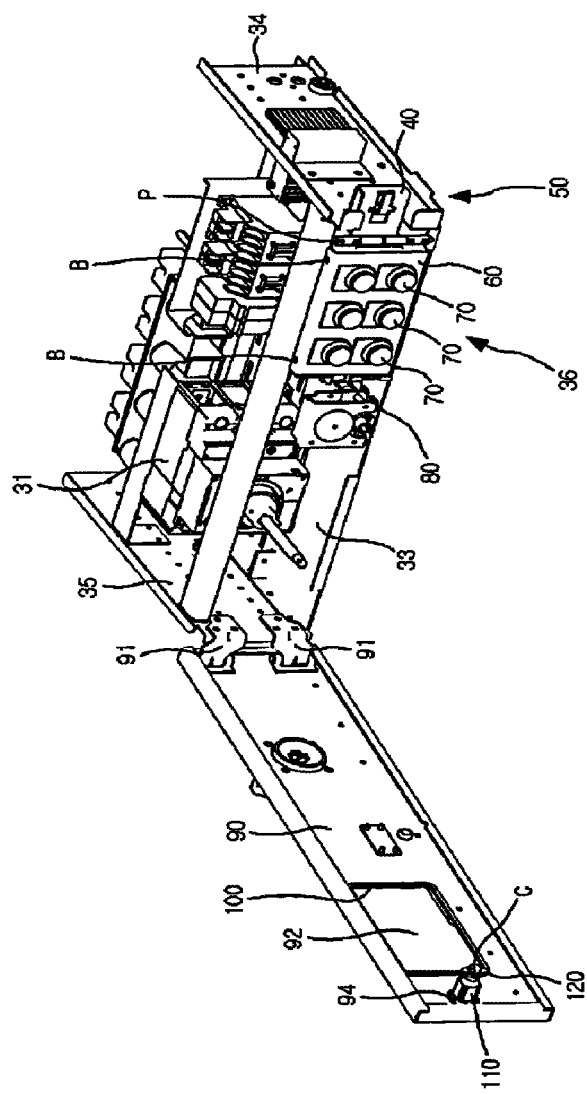
FIG. 3 is a front perspective view illustrating that a front side of an MCC unit according to an embodiment of the present disclosure is open.

FIG. 2 is a perspective view of a rear side of an MCC unit according to an embodiment of the present disclosure, and FIG. 3 is a front perspective view illustrating that a front side of an MCC unit according to an embodiment of the present disclosure is open.

The MCC unit 3 may include a circuit breaker 31 breaking an electric circuit and a drawer 32 in which the circuit breaker 31 is installed.

The circuit breaker 31 may be configured as a molded case circuit breaker (MCCB).

The drawer 32 may form a space S32 in which the circuit breaker 31 is accommodated. The drawer 2 may have a shape in which a lower side and left and right sides are closed. The drawer 32 may include a lower plate 33 and a pair of side plates 34 and 35 erected on the lower plate 33.

The MCC unit 3 may further include a display assembly 36 installed on the drawer 32. The display assembly 36 may include at least one display mechanism 70 displaying operation information of the MCC unit 3.

The MCC unit 3 may include a clip 37 connected to the bus 2. The MCC unit 3 may be mounted on the partition 16, and when the MCC unit 3 is moved in a direction toward the bus 2, the clip 37 may be connected to the bus 2.

Figure 4:
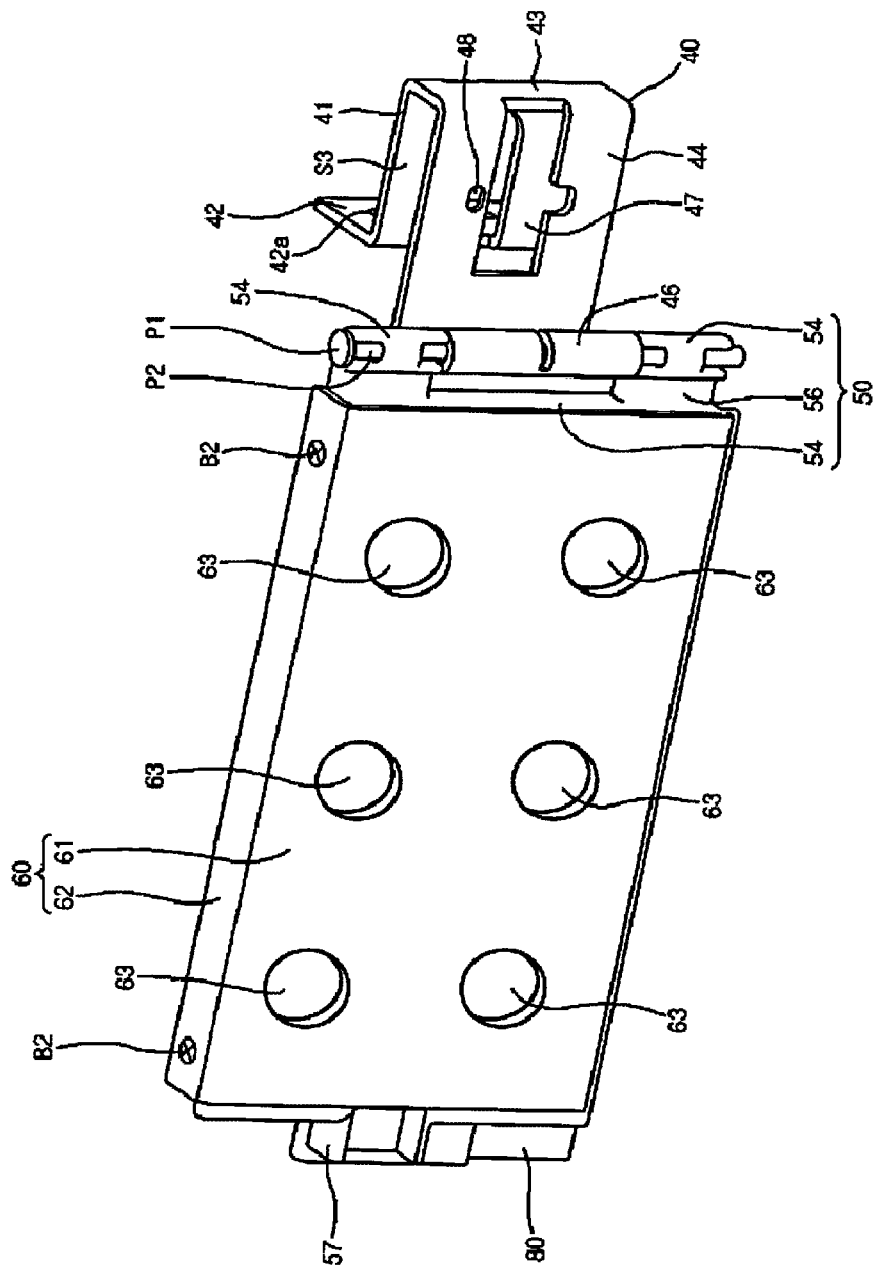
FIG. 4 is a front perspective view illustrating a display mechanism assembly of an MCC unit according to an embodiment of the present disclosure.
Figure 5:
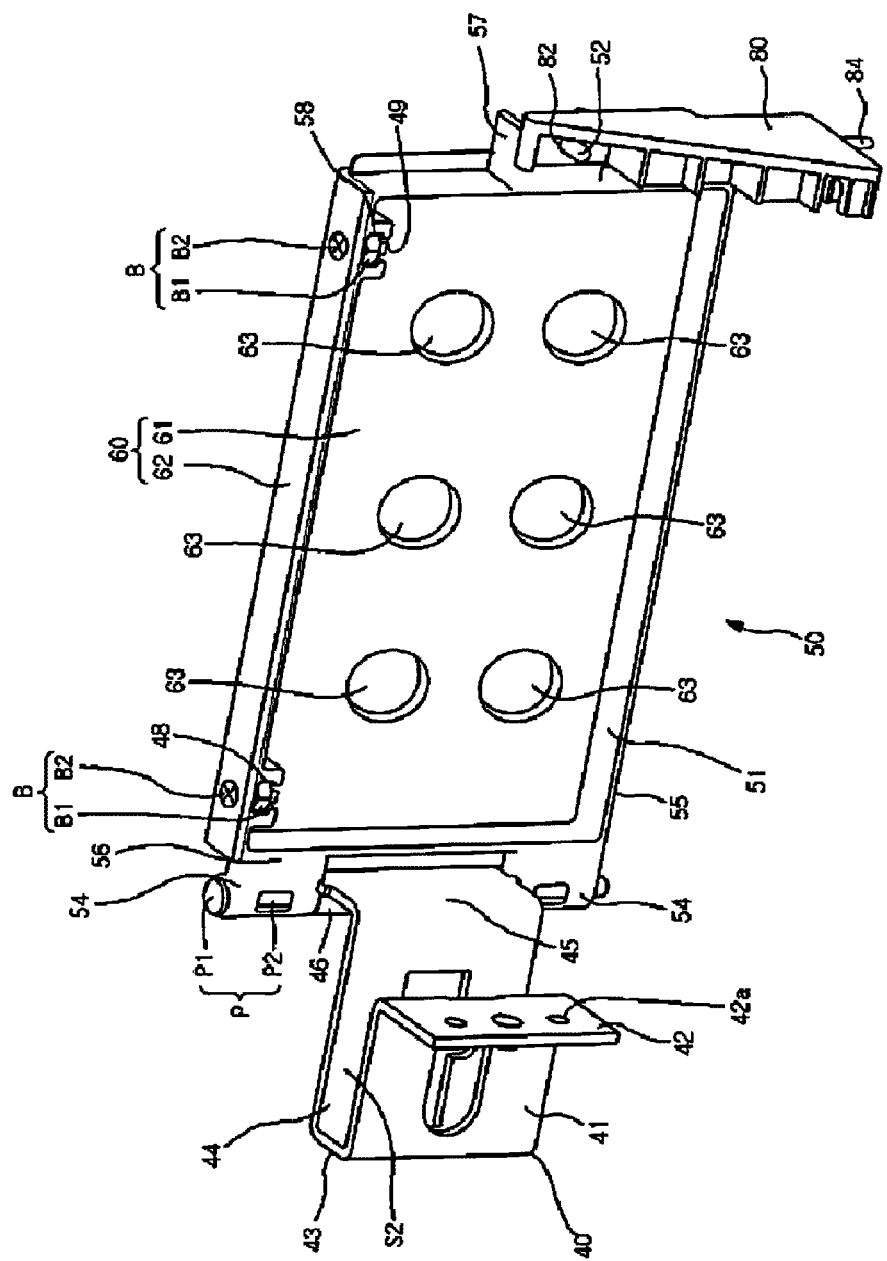
FIG. 5 is a rear perspective view illustrating a display mechanism assembly of an MCC unit according to an embodiment of the present disclosure.
Figure 6:
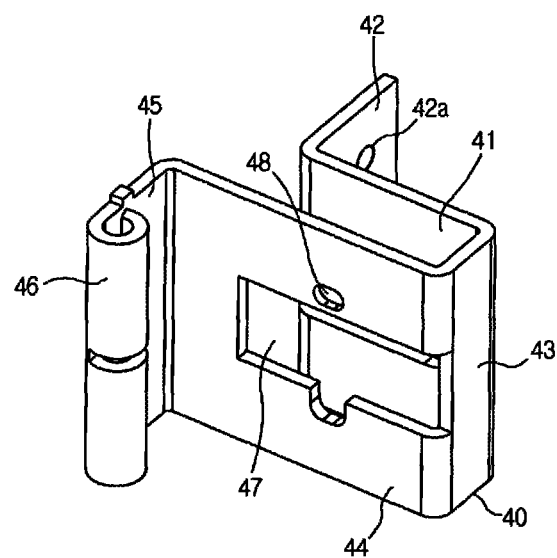
FIG. 6 is a perspective view illustrating a hinge bracket of an MCC unit according to an embodiment of the present disclosure.
Figure 7:
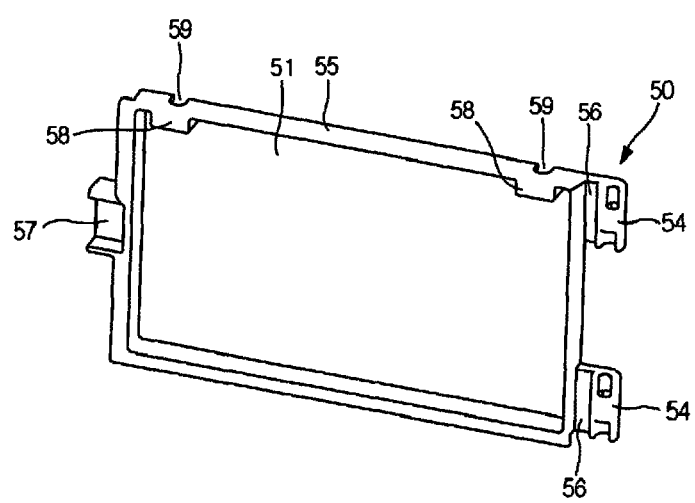
FIG. 7 is a front perspective view illustrating a base of an MCC unit according to an embodiment of the present disclosure.
Figure 8:
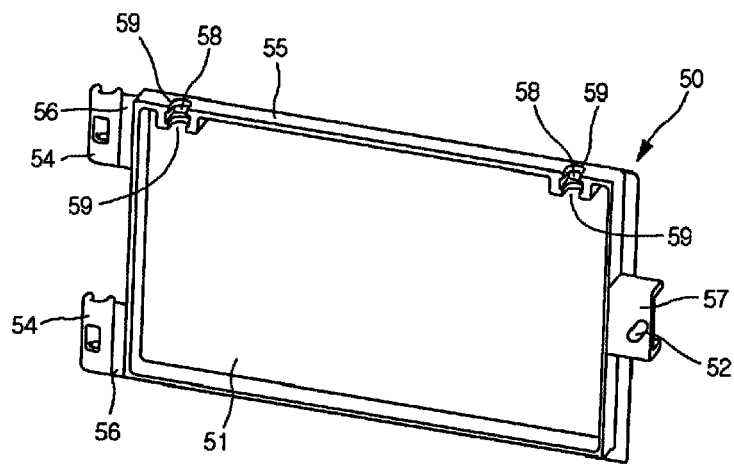
FIG. 8 is a rear perspective view illustrating a base of an MCC unit according to an embodiment of the present disclosure.
Figure 9:
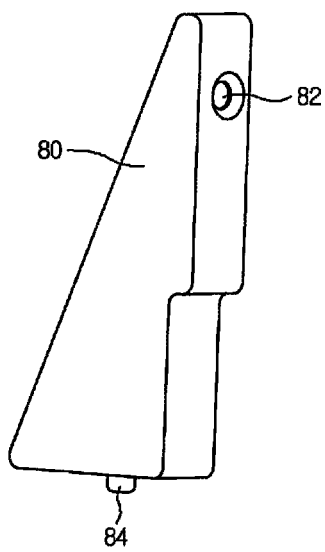
FIG. 9 is a front perspective view illustrating an anchor of an MCC unit according to an embodiment of the present disclosure.

FIG. 4 is a front perspective view illustrating a display mechanism assembly of an MCC unit according to an embodiment of the present disclosure, FIG. 5 is a rear perspective view illustrating a display mechanism assembly of an MCC unit according to an embodiment of the present disclosure, FIG. 6 is a perspective view illustrating a hinge bracket of an MCC unit according to an embodiment of the present disclosure, FIG. 7 is a front perspective view illustrating a base of an MCC unit according to an embodiment of the present disclosure, FIG. 8 is a rear perspective view illustrating a base of an MCC unit according to an embodiment of the present disclosure, and FIG. 9 is a front perspective view illustrating an anchor of an MCC unit according to an embodiment of the present disclosure.

The MCC unit 3 may include a hinge bracket 40 installed on one side of the left and right side plates 34 and 35 of the drawer 32; a base 50 connected to the hinge bracket 40 by a hinge shaft P; a display mechanism installation plate 60 fastened to the base 50 by a fastening member B; and a display mechanism 70 (please refer to FIGS. 2 and 3) installed in the display mechanism installation plate 60. The MCC unit 3 may further include an anchor 80 installed to be spaced apart from the hinge bracket 40 on the lower plate 33 of the drawer 32. The MCC unit 3 may further include a front door 90 opening and closing a front side of the drawer 32.

The hinge bracket 40 may include a rear body 41, a rear protruding body 42 protruding backwardly from one side of the rear body 41 and fastened to the drawer 32, a side body 43 bent forwardly from the other side of the rear body 41, a front body 44 bent from the side body 43 to be parallel to the rear body 41 and longer than the rear body 41, a front protruding body 45 protruding from the front body 44 in an opposite direction of the rear protruding body 42, and a hinge shaft support body 46 formed at a front end of the front protruding body 45 and surrounding an outer circumference of the hinge shaft P.

The hinge bracket 40 may be installed such that the base 50 is positioned on a front side of the drawer 32.

The rear protruding body 42 may be fastened to the side plate 34 of the drawer 32 by a fastening member such as a screw, or the like, so as to be positioned beside the side plate 34 of the drawer 32 illustrated in FIGS. 2 and 3. A fastening member through hole 42a allowing a fastening member such as a screw, or the like, to penetrate therethrough may be formed in the rear protruding body 42 and may be formed to be open in a horizontal direction.

The rear body 41 may be positioned to protrude in a lateral direction with respect to the rear protruding body 42, and may be positioned beside the side plate 34 of the drawer 32 together with the rear protruding body 42.

The side body 43 may separate the front body 44 and the rear body 41 in a forward/backward direction, and may form a space S3 between the front body 44 and the rear body 41.

Since the hinge bracket 40 has a structure in which a length of the front body 44 is longer than a length of the rear body 41, the front protruding body 45 and the hinge shaft support body 46 may be positioned on a front side of the drawer 32, and the base 50 rotatably connected to the hinge shaft support body 45 by the hinge shaft P may be positioned on a front side of the drawer 32.

The base 50, the display mechanism installation plate 60, and the display mechanism 70 may form a display mechanism assembly 36 outwardly displaying information of the MCC unit 3, and the display mechanism assembly 36 may be installed to be rotatable about the hinge bracket 40. In the display mechanism assembly 36, the base 50, the display mechanism installation plate 60, and the display mechanism 70 may be integrally rotated.

The hinge shaft p may be disposed to extend in a vertical direction. The hinge shaft P may be a vertically central shaft rotatably connecting one of left and right sides of the base 40 to the hinge bracket 40.

The hinge shaft P may include a head portion P1 and a vertical shaft portion P2.

The head portion P1 may protrude from an upper end of the vertical shaft portion P2 and may be mounted on an upper end of a hinge shaft connection part 54.

The vertical shaft portion p2 may be disposed to penetrate through the hinge shaft connection part 54 and the hinge shaft support body 46 formed in the base 50.

A base opening 51 covered by the display mechanism installation plate 60 may be formed in the base 50. The base opening 51 may be opened in a forward/backward direction of the base 50. The base 50 may have a quadrangular shape with the base opening 51 provided therein.

The base 50 may have a base protrusion 52. A position of the base 50 may be determined by the anchor 80. The base protrusion 52 may be connected to the anchor 80 and supported by the anchor 80. The base protrusion 52 may protrude from a rear surface of the base 50 in a backward direction.

The base 50 may have the hinge shaft connection part 54 to which the hinge shaft P is connected.

The base 50 may include a frame body 55 in which the base opening 51 is formed.

The base 50 may further include a connection body 56 protruding from one of left and right sides of the frame body 55 to connect the hinge shaft connection part 54 and the frame body 55. The hinge shaft connection part 54 may be spaced apart from the frame body 55 in a horizontal direction, and may be connected to the frame body 55 by the connection body 56.

The base 50 may further include an anchor facing body 57 protruding from the other side of the left and right sides of the frame body 55 and facing a front side of the anchor 80. The anchor facing body 57 may protrude in the opposite direction of the connection body 56. The anchor facing body 57 may be in contact with a front side of the anchor 80 when installed in the base 50.

The base protrusion 52 may protrude from the anchor facing body 57. The base protrusion 52 may protrude from a rear side of the anchor facing body 57 in a backward direction and may be inserted into the anchor 80.

The base 50 may rotate about the hinge shaft connection part 54, and when the base protrusion 54 is inserted into the anchor 80, the base 50 may be firmly supported by the hinge bracket 40 and the anchor 80 without being lopsided to one of left and right sides.

Meanwhile, the base 50 may include a nut insertion portion 58 in which a nut B1 (to be described hereinafter) of the fastening member B is inserted and accommodated. The nut insertion recess portion 58 may be depressed on a rear surface of the base 50. The nut insertion recess portion 58 may have a shape in which a rear side thereof is open. A nut insertion recess portion 58 may have a bolt through hole 59 formed in each of upper and lower portions thereof and allowing a bolt B2 to penetrate therethrough.

The display mechanism installation plate 60 may include a front installation plate 61 positioned in front of the base 50 and an upper installation plate 62 extending from an upper portion of the front installation plate 61 and positioned on an upper side of the base 50.

The front installation plate 61 may be positioned to cover the base opening 51 of the base 50.

The front installation plate 61 may have a display mechanism through hole 63 allowing the display mechanism 70 to be disposed in a penetrating manner. The display mechanism through hole 63 may be formed to be open in a forward/backward direction. The display mechanism through hole 63 may be provided in plurality in the front installation plate 61.

The plurality of display mechanism through holes 63 may be spaced apart from each other in a horizontal direction or in a vertical direction.

The upper installation plate 62 may protrude from an upper portion of the front installation plate 61 in a backward direction. The upper installation plate 62 may be disposed to cover an upper surface of the base 50. The upper installation plate 62 may be mounted on an upper surface of the base 50 and may be mounted on the base 50 by a bolt B2 and a nut B1 as fastening members B.

The display mechanism installation plate 60 may have a bolt through hole through which the bolt B2 (to be described hereinafter), among the fastening members B, penetrates. The bolt through hole may be formed to be open in a vertical direction in the upper installation plate 62. The bolt through hole may be formed above the nut insertion recess portion 48.

The fastening member B may include the nut B1 inserted into the nut insertion recess portion 54 formed in the base 50 and a bolt B2 fastened to the nut B1 through a bolt through hole formed in the display mechanism installation plate 60.

The nut B1 may be inserted into the nut insertion recess portion 58 from a rear side of the base 50 and supported within the nut insertion recess portion 58.

The bolt B2 may be inserted into the bolt through hole of the display mechanism installation plate 60 from above the display mechanism installation plate 60 and may be fastened to the nut B1 inserted into the nut insertion recess portion 54, and the display mechanism installation plate 60 may be fastened to the base 50 by the bolt B2 and the nut B1.

The display mechanism 70 may be configured as a lighting device such as a lamp, a light emitting diode (LED) unit, and the like. As illustrated in FIG. 3, the display mechanism 70 may be installed such that a front portion thereof protrudes in a forward direction with respect to the display mechanism installation plate 60, and as illustrated in FIG. 2, a rear portion thereof protrudes in a backward direction with respect to the display mechanism installation plate 60.

The anchor 80 may have a base protrusion aligning portion 82 to which a base protrusion 52 is inserted to determine a position of the base protrusion 52. The base protrusion aligning portion 82 may be a position determining portion determining a position of the base protrusion 52 as the base protrusion 52 is inserted thereinto. The base protrusion aligning portion 82 may be formed as a base protrusion insertion hole formed to penetrate through the anchor 80 in a forward/backward direction and allow the base protrusion 52 to be inserted thereinto. The base protrusion aligning portion 82 may also be configured as a base protrusion accommodation recess portion protruding from the anchor 80 in a backward direction and allowing the base protrusion 52 to be inserted thereinto.

An insertion protrusion 84 to be inserted and coupled to the drawer 32 may protrude from a lower portion of the anchor 80. The anchor 80 may be inserted into an insertion protrusion insertion hole formed in the lower plate 33 of the drawer 32 and may support the base 50, in a state of being vertically erected on the lower plate 33.

The anchor 80 may be installed such that the base 50 is caught in a backward direction when the base 50 is rotated, and may serve as a base stopper preventing over-rotation of the base 50.

Meanwhile, the front door 90 may be installed to rotate centered on one of left and right sides of the drawer 32. As illustrated in FIG. 3, the front door 90 may be installed to rotate centered on the opposite side of the hinge bracket 40.

In the drawer 32, a front door hinge bracket 91 to which the front door 90 is rotatably connected may be installed on the opposite side of the hinge bracket 40. An opening 92 may be provided in a position of the front door 90 corresponding to the display mechanism installation plate 60.

The MCC unit 3 may further include a packing 100 installed along the opening 92. The packing 100 may be tightly attached to the display mechanism installation plate 60 when the front door 90 is closed, and may stop a gap between the opening 92 and the display mechanism installation plate 60. A foreign object such as dust or water may be blocked by the packing 100 so as to be prevented from penetration between the opening 92 and the display mechanism installation plate 60. The packing 100 may be formed of an elastic material, alleviate an impact when the front door 90 is closed, and minimize damage to the display mechanism installation plate 60.

Figure 10:
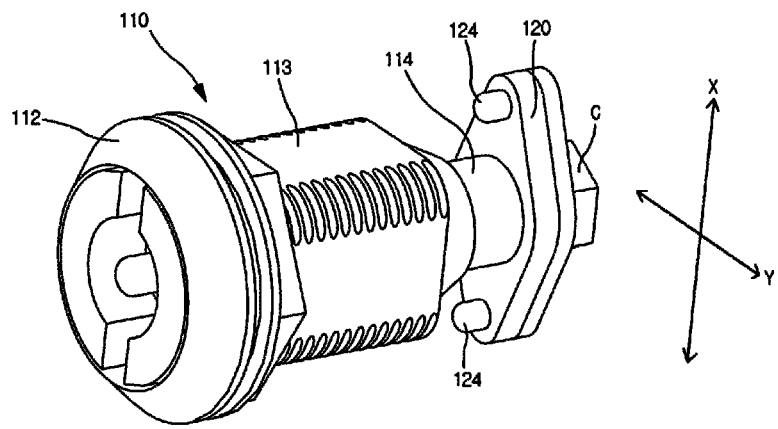
FIG. 10 is a perspective view illustrating a locker and a locking body illustrated in FIG. 3.
Figure 11:
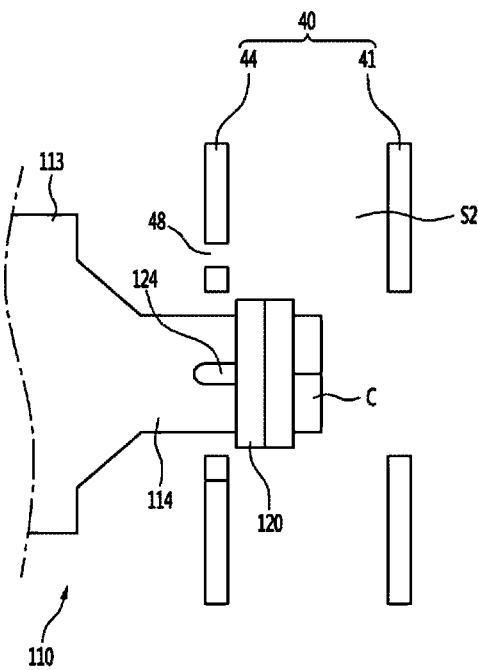
FIG. 11 is a cross-sectional view illustrating that the locking body illustrated in FIG. 10 is inserted into a hinge bracket such that it is able to be unlocked.
Figure 12:
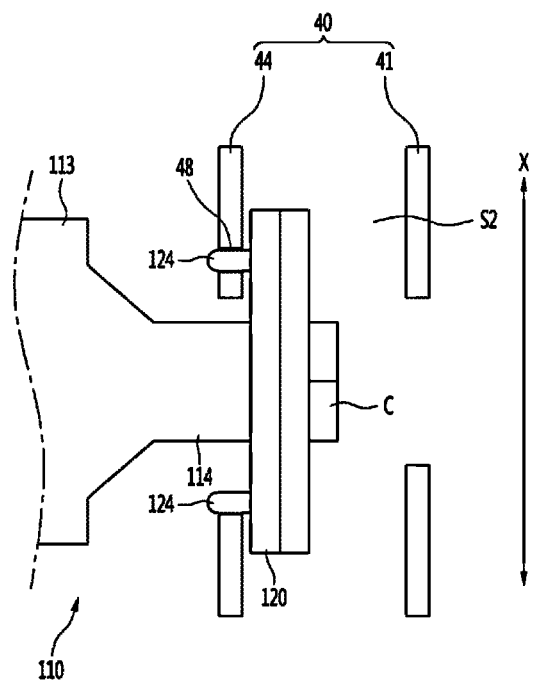
FIG. 12 is a cross-sectional view illustrating that the locking body illustrated

FIG. 10 is a perspective view illustrating a locker and a locking body illustrated in FIG. 3, FIG. 11 is a cross-sectional view illustrating that the locking body illustrated in FIG. 10 is inserted into a hinge bracket such that it is able to be unlocked, and FIG. 12 is a cross-sectional view illustrating that the locking body illustrated FIG. 11 is locked to a hinge bracket.

As illustrated in FIGS. 3 and 10 to 12, the MCC unit may further include a door locker 110 rotatably disposed in the front door 90 and a locking body 120 fastened to the door locker 110 and locked to the hinge bracket 40 or unlocked therefrom.

The door locker 110 may include a head portion 112 spaced apart from the locking body 120 and a neck portion 114 positioned between the head portion 112 and the locking body 120 and having a size smaller than that of the head portion 112. The door locker 110 may further include a connection portion 113 positioned between a rear end of the head portion 112 and a front end of the neck portion 114. The connection portion 113 may be formed to be smaller than the head portion 112 and greater than the neck portion 114.

The head portion 112 may be positioned to protrude in a forward direction, relative to a front side of the front door 90 to allow the user to rotate the head portion 112 using his hand or a tool.

The head portion 112 or the connection portion 113 may be disposed to penetrate through the locker through hole 94 formed in the front door 90.

The neck portion 114 may be disposed at a rear end of the connection portion 113.

The locking body 120 may be fastened to the neck portion 114. The locking body 120 may be fastened to a rear end of the neck portion 114 by a fastening member C.

The locking body 120 may be integrally rotated together with the door locker 110. The locking body 120 may be locked to the hinge bracket 40 or unlocked therefrom according to positions thereof.

The hinge bracket 40 may have a neck portion through hole 47 (please refer to FIGS. 4 and 6) through which the locking body 120 passes and in which the neck portion 114 is positioned in a penetrating manner.

The locking body 120 may be formed to have a size smaller than that of the neck portion through hole 47. After the locking body 120 passes through the neck portion through hole 47 as illustrated in FIG. 11, the locking body 120 may rotate to be locked in the vicinity of the neck portion through hole 47 in a forward direction as illustrated in FIG. 12.

The locking body 120 may include a front protrusion 124 protruding in a forward direction. The hinge bracket 40 may have a front protrusion aligning portion 48 formed in the vicinity of the neck portion through hole 47, into which the front protrusion 124 is inserted.

The front protrusion 124 may be provided in plurality in the locking body 120, and one of the plurality of front protrusions 124 may be inserted into the front protrusion aligning portion 48.

The neck portion through hole 47 illustrated in FIGS. 4 and 6 may be formed to extend in a horizontal direction. The neck portion through hole 47 may have a rectangular shape and a length thereof in the horizontal direction may be greater than a height thereof.

The locking body 120 may have a diamond shape. The locking body 120 may be formed such that a length L1 thereof in a first direction X is greater than a length L2 thereof in a second direction Y perpendicular to the first direction X. The first direction X of the locking body 120 may be a longer direction and the second direction Y thereof may be a shorter direction.

When the front door 90 is closed, as illustrated in FIG. 11, a worker may rotate the door locker 110 such that it lies down to extend laterally in a horizontal direction.

As illustrated in FIG. 11, when lying to extend laterally in the horizontal direction, the locking body 120 may pass through the neck portion through hole 47 of the hinge bracket 40 from a front side of the neck portion through hole 47. As illustrated in FIG. 12, the locking body 120 may be erected to extend in a vertical direction in a rear position of the neck portion through hole 47 of the hinge bracket 40, and here, the locking body 120 may be caught by upper and lower portions of the neck portion through hole 47 in a forward direction.

The front protrusion 124 may be formed on a front surface of the locking body 120 and protrude in a forward direction, and when the locking body 120 is erected to extend in the vertical direction as illustrated in FIG. 12, any one of the plurality of the front protrusions 124 may be inserted into the front protrusion aligning portion 48.

When the front protrusion 124 is inserted into the front protrusion aligning portion 48, the locking body 120 may be limited in arbitrary rotation and may be locked to the hinge bracket 40 by the front protrusion so as to be supported.

That is, the front door 90, in a state of being supported by the front door hinge bracket 91 illustrated in FIG. 3, may be supported by the hinge bracket 40 by means of the door locker 110 and the locking body 120, and here, the front door 90 may be firmly supported by the front door hinge bracket 91 and the hinge bracket 40, without being inclined to one of the left and right sides.

The front door 90 may be disposed to extend in a horizontal direction on a front side of the drawer 32 and close the front side of the drawer 32.

Meanwhile, when the front door 90 is intended to be opened, a worker may reversely rotate the door locker 110 to lie down in a horizontal direction as illustrated in FIG. 11. The locking body 120, in a state of lying down laterally as illustrated in FIG. 11, may pass through the neck portion through hole 47 of the hinge bracket 40 so as to escape to a front side of the neck portion through hole 47. When the locking body 120 is escaped from the neck portion through hole 47 as mentioned above, the front door 90 may be unlocked from the hinge bracket 40 and rotate about the front door hinge bracket 91 in a forward direction.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A motor control center (MCC) unit comprising:
   a drawer having a space for accommodating a circuit breaker;
   a hinge bracket installed on one of left and right sides of the drawer;
   a base connected to the hinge bracket by a hinge shaft; and
   a display mechanism installation plate fastened to the base by a fastening member.

2. The MCC unit of claim 1, further comprising:
   an anchor installed to be spaced apart from the hinge bracket on a lower plate of the drawer,
   wherein a base protrusion is formed in the base and a base protrusion aligning portion is provided in the anchor and allowing the base protrusion to be inserted therein to determine a position of the base protrusion.

3. The MCC unit of claim 1, further comprising:
   a front door installed to rotate centered on the opposite side of the hinge bracket,
   wherein an opening is provided in a position of the front door corresponding to the display mechanism installation plate.

4. The MCC unit of claim 3, further comprising:
   a packing installed along the opening.

5. The MCC unit of claim 3, wherein the hinge bracket comprises:
   a rear body;
   a rear protruding body protruding backwardly from one side of the rear body and fastened to the drawer;
   a side body bent forwardly from the other side of the rear body;
   a front body bent from the side body to be parallel to the rear body and longer than the rear body;
   a front protruding body protruding from the front body in an opposite direction of the rear protruding body; and
   a hinge shaft support body formed at a front end of the front protruding body and surrounding an outer circumference of the hinge shaft.

6. The MCC unit of claim 1, wherein the fastening member comprises:
   a nut inserted into a nut insertion recess portion formed in the base; and
   a bolt fastened to the nut through a bolt through hole formed in the display mechanism installation plate.

7. The MCC unit of claim 1, further comprising:
   a door locker rotatably disposed in the front door; and
   a locking body fastened to the door locker and locked to the hinge bracket or unlocked therefrom.

8. The MCC unit of claim 7, wherein the door locker comprises:

a head portion spaced apart from the locking body; and
a neck portion positioned between the head portion and the locking body and having a size smaller than that of the head portion,
wherein the locking body is fastened to the neck portion.

9. The MCC unit of claim 8, wherein
the hinge bracket has a neck portion through hole through which the locking body passes and in which the neck portion is positioned in a penetrating manner, and
the locking body has a size smaller than that of the neck portion through hole, and after the locking body passes through the neck portion through hole, the locking body rotates to be locked in the vicinity of the neck portion through hole in a forward direction.

10. The MCC unit of claim 9, wherein
the locking body includes a front protrusion protruding in a forward direction, and
the hinge bracket has a front protrusion aligning portion formed in the vicinity of the neck portion through hole, into which the front protrusion is inserted.

11. The MCC unit of claim 10, wherein the front protrusion is provided in plurality in the locking body, and one of the plurality of front protrusions is inserted into the front protrusion aligning portion.

* * * * *